July 12, 1938.  J. W. SHIELDS  2,123,861
WEIGHTED TRACTOR WHEEL
Filed Dec. 4, 1936
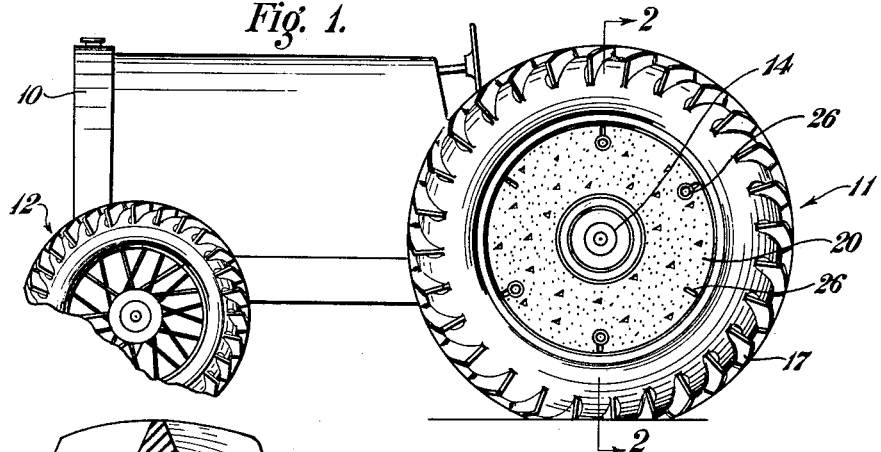
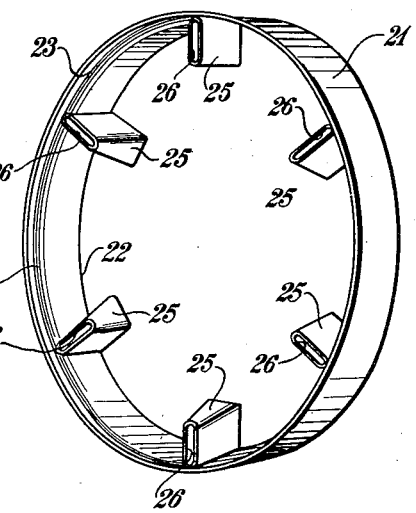
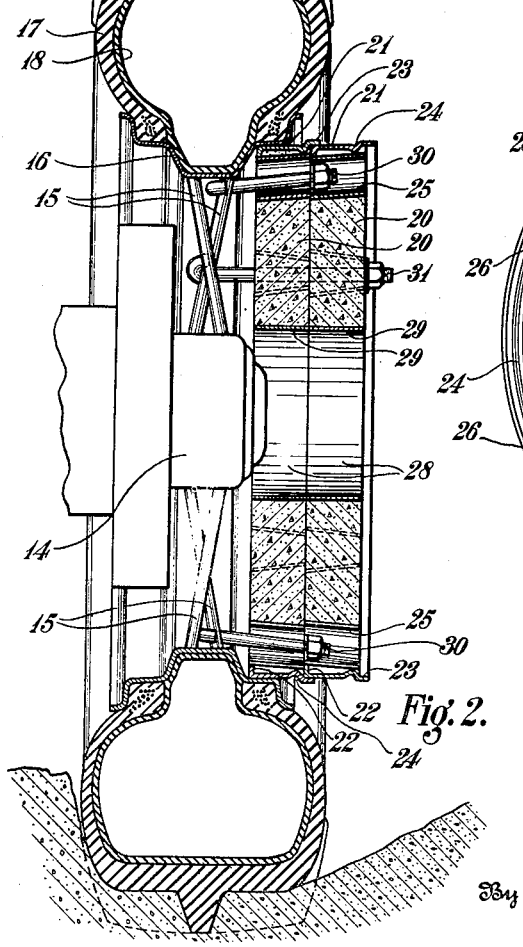
Inventor
Jesse W. Shields
By Albert L. Ely
Attorney Patented July 12, 1938

2,123,861

UNITED STATES PATENT OFFICE 2,123,861

WEIGHTED TRACTOR WHEEL

Jesse W. Shields, Akron, Ohio, assignor to The Firestone Steel Products Company, Akron, Ohio, a corporation of Ohio Application December 4, 1936, Serial No. 114,163

7 Claims. (Cl. 301—41)

This invention relates to weighted tractor wheels and more especially it relates to wheel weights of improved construction for application to tractor wheels.

Tractors for general farm use usually are as light in weight as possible so that they may be used for such work as only a light tractor is suitable. Such tractors are, however, capable of pulling heavy loads, and when conditions are such that it is difficult to secure adequate traction for pulling heavy loads, it is common practice to add to the weight of the tractor, usually by applying one or more weights to each driving wheel thereof.

The use of such weights is especially advantageous in the present invention wherein the tractor wheels are equipped with pneumatic tires. The latter are inflated to relatively low pressure, the weight of the tractor and added wheel weights causing the tires to flatten substantially in the region thereof that are in contact with the ground, thereby providing the necessary traction for the driving of the vehicle. Thus the use of wider tires for obtaining the required traction is obviated, and the tires used are narrow enough to fit within standard plow furrows.

The chief objects of the invention are to provide an improved weight for use on tractor wheels; to provide a weight of the character mentioned that is especially applicable for use on tractor wheels provided with pneumatic tires; to avoid the expense of shipment of heavy tractor wheel weights; to provide against localization of the weight of the tractor weights on the wheel structures; and to provide a construction that permits each wheel weight to be individually secured to the wheel so that a weight or weights may be added or removed from the wheel without disturbing other weights mounted thereon. Other objects will be manifest.

Of the accompanying drawing,

Figure 1 is a side elevation of a tractor equipped with tractor wheels embodying the invention;

Figure 2 is a section of the improved tractor wheel taken on the line 2—2 of Figure 1; and Figure 3 is a perspective view of a metal band constituting the peripheral member of the improved wheel weight.

Referring to Figure 1 of the drawing, there is shown a four-wheel tractor 10 of the type in which the driving is effected by means of the two rear wheels, such as the wheel 11, the front wheels 12 carrying part of the load of the tractor and being utilized for steering the same. It is upon the rear wheels 11 that the improved wheel weights are mounted.

The weight construction and details of the wheel 11 are illustrated in Figure 2 wherein it will be seen that the wheel 11 comprises a hub 14, spokes 15, 15, a drop center tire rim 16, and a pneumatic tire casing 17 and inner tube 18 mounted upon said rim. The wheel weights are in the form of flat discs that are secured to that side of the wheel that faces outwardly when the wheel is mounted for use.

Each wheel weight consists of a concrete structure 20 having a metal peripheral facing and metal-lined bolt holes. The metal peripheral facing consists of an endless, sheet metal ring 21 of which one lateral margin is formed with a radially inwardly extending circumferential flange 22. The outside diameter of this side of the ring is such that the ring will fit nicely within the tire rim 16, in laterally abutting relation to the central circumferential well thereof. The other lateral marginal portion of the ring comprises a narrow circumferential region 23 of slightly larger diameter than the opposite margin of the ring, the arrangement permitting nesting of juxtaposed rings. Contiguous with the region 23, the ring is formed with an inwardly extending circumferential rib or bead 24. Secured to the inner periphery of the ring 21, as by welding, are a plurality of symmetrically arranged metal bolt hole liners 25, 25 that rest upon the flange 22 and bead 24, the front end of each liner member being flush with the inner limit of the region 23, and the rear end of each of said members being flush with the outer lateral face of flange 22. Each liner 25 is tubular in form, and tapers toward the front so as to define a relatively narrow, radially disposed slot 26 thereat, which slot is relatively wide at the rear of the liner.

The concrete structure 20 fills the ring 21 from the outer lateral face of the flange 22 at the rear thereof to the inner limit of the region 23 on the front of the ring, except for an axial opening 28 in the middle of the structure. As shown in Figure 2, the axial opening 28 has an annular metal lining 29, the sole purpose of which is to serve as a former while the concrete of the structure 20 is being poured. Obviously removable formers could be used, in which case there would be no lining in the opening 28.

Each wheel weight may be secured to the tractor wheel by a pair of individual hook-bolts 30, 30 that extend through two diametrically opposite or spaced apart slots 26 in the weight and are hooked about respective spokes 15 of the wheel. When a second weight is mounted upon the wheel, it is nested within the circumferential region 23 of the first weight, and secured to the wheel by hook-bolts 31, 31 that are of longer length than the hook-bolts 30, and which extend through the slots 26 of both weights, of which the slots in the first weight are unoccupied by the bolts 30. If three weights are used on one wheel (not shown), the first weight is secured by one bolt, the second by one bolt, and the third by three bolts. Since the slots 26 are tapered and are larger at their inner ends, the slots of the superposed weight easily accommodate the nuts on the outer ends of the bolts that secure the underlying weight to the wheel. The axial aperture 28 in the weight that is first mounted on the wheel receives the hub 14 of the wheel.

The filling of the rings 21 with concrete is a simple matter and can be performed locally. Consequently the manufacturer is required to ship only the rings and bolts with resulting saving of transportation costs. Preferably the rings 21 are of such width that when filled with concrete as shown, the weight thereof will be about 150 pounds without added reinforcing.

The feature of fitting the weight into the inner periphery of the tire rim provides accurate centering of the weight, as does the feature of nesting the superposed weight within the underlying weight. Furthermore, the arrangement provides wide distribution of the weight of the members so that local reinforcing of the wheel is not required, and no weight is borne by the relatively small wheel hub 14, as is the case in some weighted wheels. The arrangement also avoids the applying of shearing strains to the bolts that secure the weights to the wheel so that failure of the bolts is prevented.

The invention makes it possible to add or remove weights from a wheel without disturbing other weights thereon, and it achieves the other advantages set out in the foregoing statement of objects.

Modification may be resorted to without departing from the spirit of the invention or the scope of the appended claims.

What is claimed is:

1. The combination with a wheel comprising rim, hub and spokes, of a plurality of interchangeable traction weights mounted thereon, the first of said weights telescoping with the wheel rim to be supported thereby and the remaining weights being mounted successively on each other and telescoping with the adjacent weight at the outer periphery thereof, and means engaging said spokes for securing the weights to the wheel.

2. The combination with a vehicle wheel comprising rim, hub, and spokes, of a plurality of interchangeable traction weights mounted in superposed relation thereon, each of said weights being formed with a series of bolt holes therein, which holes are relatively large on the rear face of the weight and taper to a relatively small opening on the front face of the weight, and hook-bolts engageable with the said spokes for securing the weights individually to the wheel, the nuts on the ends of one series of bolts being received in bolt holes in the superposed weight.

3. A wheel weight of the character described comprising a metal band, a plurality of symmetrically arranged, bolt hole liners of metal permanently secured to said band, and a concrete filling within said band.

4. A traction weight of the character described comprising a metal band, a plurality of symmetrically arranged, bolt-hole liners of metal permanently secured thereto, each of said liners being tapered so as to define a relatively narrow radially disposed slot at one end and a relatively wide slot at its opposite end, and a concrete filling within said band.

5. A wheel weight shell of the character described comprising a metal band, and a plurality of symmetrically arranged, bolt hole liners of metal permanently secured to the said band.

6. A wheel weight shell of the character described comprising a metal band, and a plurality of symmetrically arranged, bolt hole liners of metal welded to the inner surface of said band.

7. A traction weight shell of the character described comprising a metal band, and a plurality of symmetrically arranged, bolt hole liners of metal permanently secured thereto, each of said liners being tapered so as to define a relatively narrow radially disposed slot at one of its ends and a relatively wide slot at its other end.

JESSE W. SHIELDS.